No. 710,550. Patented Oct. 7, 1902.
C. A. ZEISER.
LENS MOUNT.
(Application filed Feb. 15, 1902.)
(No Model.)
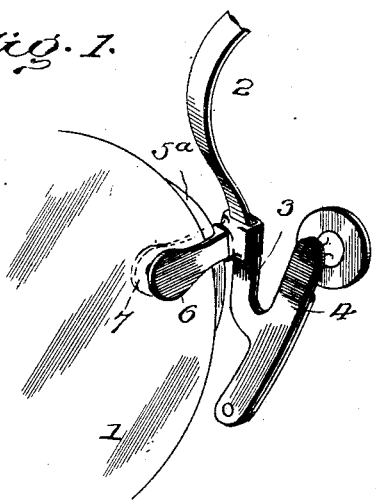
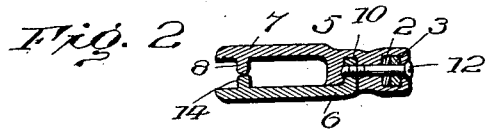
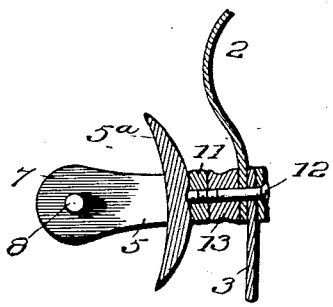
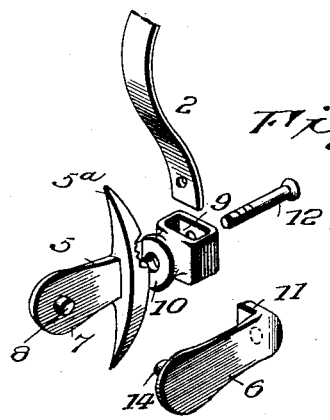
Inventor
Charles A. Zeiser,
Witnesses
By
Thos. E. Robertson
Attorney

UNITED STATES PATENT OFFICE.

CHARLES A. ZEISER, OF CHICAGO, ILLINOIS, ASSIGNOR OF ONE-HALF TO HENRY BORSCH, OF CHICAGO, ILLINOIS.

LENS-MOUNT.

SPECIFICATION forming part of Letters Patent No. 710,550, dated October 7, 1902.

Application filed February 15, 1902. Serial No. 94,287. (No model.)

*To all whom it may concern:*

Be it known that I, CHARLES A. ZEISER, a citizen of the United States of America, and a resident of Chicago, in the county of Cook and State of Illinois, have invented certain new and useful Improvements in Lens-Mounts, of which the following is a specification.

This invention relates to an improvement in lens-mounts for spectacles and eyeglasses; and the object of my invention is to provide a lens-mount for rimless spectacles and eyeglasses which will be extremely simple in construction, lessen the liability of the breakage of the lens, and be capable of being held in position by the same screw that secures the bridge and nose-guard.

With this object in view my invention consists in the lens-mount of the peculiar construction and arrangement of parts hereinafter described in detail and then definitely pointed out in the appended claim.

In the drawings accompanying this application, Figure 1 is a perspective view of part of a pair of eyeglasses with my improved lens-mount secured thereon. Fig. 2 is a horizontal section of the lens-mount detached. Fig. 3 is a vertical section of the same. Fig. 4 is a detail perspective of the parts slightly separated.

Referring now to the details of the drawings by numerals, 1 represents the lens, and 2 the bridge to which the said lens is secured by my lens-mount. 3 indicates the usual offset portion of the nose-guard 4.

My lens-mount, which is designed, as usual, to connect the lens 1 with the bridge 2 and the nose-guard 4, consists of two main parts 5 and 6. (Shown best in Fig. 4.) The member 5 is provided with the usual wings 5ª, which are formed to contact with the edge of the lens, and an ear 7, provided with a stud or pin 8, adapted to enter a perforation or opening in the lens, and thus hold the latter in position. At the other end of the member 5 is a preferably rectangular opening 9, and between the inner wall of said opening and the wings 5ª I form a recess 10. The opening 9 is for the purpose of receiving the lower end of the bridge 2 and the upper portion of the offset part 3 of a nose-guard 4, a screw 12 passing through a perforation in the outer wall of the opening 9, through said parts 2 and 3, and is then screwed into the metal at the rear of the bridge, as shown at 13.

The companion part of my lens-mount comprises only the side 6, having an ear 11 formed at right angles thereto which is adapted to enter the recess 10, the ear 11 having a perforation therein through which passes the end of the screw 12, which thus secures the member 6 in position. The side 6 may be provided with a stud or pin 14 to go part way through the perforation in the lens; but this is not absolutely necessary.

From an inspection of my drawings it will be seen that when the lens is placed in position between the two members 5 and 6 and the screw 12 inserted in position through the bridge 2 and arm 3 of the nose-guard 4 the said screw not only holds the bridge and nose-guard in position, but passes through the perforation in the ear 11 of the part 6 and holds said part 6 firmly to the member 5, thus clamping the lens between said members 5 and 6.

In my drawings I have illustrated the end of the part 5 as having an opening 9 therein; but said opening may be merely a recess, in which case the outer wall of the opening shown in the drawings will be dispensed with.

What I claim as new is—

In an eyeglass-frame and in combination with the bridge thereof, a lens-mount having one member consisting of a side bar comprising an ear coacting with the face of the lens and having a recess to receive said bridge, a second member consisting of a side bar comprising an ear to coact with the opposite face of the lens and having a perforated ear projecting substantially at right angles therefrom, and a screw passing through the bridge, the first-mentioned side bar and the perforated ear of the second side bar and thereby securing all the parts together, substantially as described.

Signed by me at Chicago, Illinois, this 10th day of February, 1902.

CHARLES A. ZEISER.

Witnesses:
PERCY Z. MCDONALD,
FRANK ALDEN.